(12) United States Patent
Clary et al.

(10) Patent No.: US 10,966,473 B1
(45) Date of Patent: *Apr. 6, 2021

(54) FACE MASK AND LINER ASSEMBLY, SYSTEM, AND METHODS

(71) Applicant: Tri-State Media, LLC, Wilmington, OH (US)

(72) Inventors: John David Clary, Waynesville, OH (US); Diana Sue Clary, Waynesville, OH (US); Christian Reece Clary, Waynesville, OH (US); Joshua James Clary, Waynesville, OH (US); Olivia Noel Clary, Waynesville, OH (US); Abigail Brooke Clary, Waynesville, OH (US)

(73) Assignee: TRI-STATE MEDIA, LLC, Wilmington, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,414

(22) Filed: May 29, 2020

Related U.S. Application Data

(63) Continuation of application No. 16/867,445, filed on May 5, 2020.

(51) Int. Cl.
*A41D 13/11* (2006.01)

(52) U.S. Cl.
CPC .................................. *A41D 13/11* (2013.01)

(58) Field of Classification Search
CPC ............ A41D 13/1115; A41D 13/1107; A41D 13/1146; A41D 13/1161; A41D 13/1169; A41D 13/1176; B63F 3/02; B63F 1/00; A45D 44/12

USPC .......... 2/9; 128/206.11, 206.12, 206.14, 863; 206/438; 225/93

See application file for complete search history.

(56) References Cited

U.S. PATENT DOCUMENTS

| | | | | |
|---|---|---|---|---|
| 3,261,027 | A | * | 7/1966 | Lambert ................ A45D 44/12 2/174 |
| 4,067,067 | A | * | 1/1978 | Neuls ....................... A41D 3/08 2/84 |
| 4,856,535 | A | * | 8/1989 | Forbes ............... A41D 13/1176 128/857 |
| 6,453,902 | B1 | | 9/2002 | Hollander et al. |
| 6,609,516 | B2 | | 8/2003 | Hollander et al. |
| 10,532,879 | B2 | * | 1/2020 | Ito ........................ A62B 18/082 |
| 2004/0078860 | A1 | * | 4/2004 | Bell .................... A41D 13/1161 2/9 |
| 2007/0062843 | A1 | * | 3/2007 | Rudd ................. B65D 83/0805 206/581 |
| 2009/0277451 | A1 | * | 11/2009 | Weinberg ........... A41D 13/1176 128/206.14 |

(Continued)

FOREIGN PATENT DOCUMENTS

WO    WO 2016025266    *    2/2016    ............. A41D 13/11

*Primary Examiner* — Katherine M Moran
(74) *Attorney, Agent, or Firm* — Taft Stettinius & Hollister LLP; Elizabeth A. Shuster; W. Michael Etienne

(57) ABSTRACT

A facial barrier assembly includes a liner including distinct sheets and a barrier including distinct face masks. The face masks are removably coupled to the sheets. Common perforations extend through the liner and the barrier to define the distinct sheets and, in some cases, the distinct face masks. The liner and the barrier are arranged as roll or a fanfold.

10 Claims, 11 Drawing Sheets

(56) References Cited

U.S. PATENT DOCUMENTS

| | | | |
|---|---|---|---|
| 2011/0067701 A1* | 3/2011 | Duffy | A41D 13/1115 128/206.19 |
| 2011/0114690 A1* | 5/2011 | Hollander | A41D 13/1169 225/93 |
| 2012/0325843 A1* | 12/2012 | Tsuei | A41D 13/1115 221/303 |
| 2016/0015098 A1* | 1/2016 | Conlon | A41D 13/1192 128/863 |
| 2019/0053550 A1* | 2/2019 | Abdo | A41D 13/1115 |

* cited by examiner

FACE MASK AND LINER ASSEMBLY, SYSTEM, AND METHODS

RELATED APPLICATIONS

This application is a continuation of U.S. patent application Ser. No. 16/867,445, filed May 5, 2020, the disclosure of which is hereby incorporated by reference in its entirety.

FIELD OF THE DISCLOSURE

The present application relates to face masks, and more particularly to face masks that are part of a facial barrier assembly that also includes a liner.

BACKGROUND

Face masks provide protection against droplets, splashes, or sprays of bodily or hazardous fluids. Many conventional face masks have strings, bands, or other materials configured to wrap around the ears to hold the face mask in position on a user's face. Strings, bands, and other such materials may be undesirable to a user and increase manufacturing time, cost, and complexity. Additionally, face masks are often most needed when sanitation is a concern for the user; however, conventional face masks are difficult to distribute to the user on a unit-by-unit basis in a sanitary manner. Finally, shipping and storage of conventional face masks may be challenging due to the relatively larger sizes and obscure shapes of conventional face masks.

What is needed, therefore, is a face mask assembly, system, and/or method that is associated with decreased manufacturing time, cost, and complexity. There is also a need for an assembly, system, and/or method without ear strings or bands. There is also a need for an assembly, system, and/or method may be made available to a user in an arrangement that allows the user to obtain a single face mask without contaminating other face masks. What is also needed is a face mask of a convenient shape, size, and arrangement for shipping and storage.

SUMMARY

In an illustrative embodiment of the disclosure, a facial barrier assembly comprises: a liner including a plurality of sheets, wherein each sheet of the plurality of sheets is coupled to at least one additional sheet of the plurality of sheets; and a plurality of face masks; wherein each face mask of the plurality of face masks is removably coupled to a corresponding sheet of the plurality of sheets; and wherein the plurality of sheets and the plurality of face masks are arranged to form at least one of: (i) a fanfold wherein the liner and the barrier are folded on themselves, and (ii) a cylindrical roll wherein the liner and barrier are wrapped about themselves without folding.

In some embodiments, each sheet of the plurality of sheets includes a first side and a second side opposite the first side; and wherein each sheet of the plurality of sheets is coupled to an adjacent sheet of the plurality of sheets at the first or second side of the adjacent sheet.

In some embodiments, perforations extend through the liner and are defined along the first side and the second side of each sheet to define linear boundaries between adjacent sheets of the plurality of sheets.

In some embodiments, the facial barrier assembly further comprises a barrier including the plurality of face masks; wherein the perforations extend through the barrier; and wherein the perforations define linear boundaries between adjacent face masks of the plurality of face masks.

In some embodiments, an adhesive material is positioned between each face mask and the corresponding sheet to which each face mask is removably coupled.

In some embodiments, the adhesive material is in contact with the face mask and spaced apart from the corresponding sheet when a portion of the face mask is removed from the corresponding sheet.

In some embodiments, the adhesive material is shaped as a continuous loop.

In some embodiments, the adhesive material engages the entirety of an outermost perimeter of each face mask.

In some embodiments, the adhesive material includes a first linear stripe positioned at a top side of the face mask, a second linear stripe positioned at a bottom side of the face mask, and a pair of aligned middle stripes positioned between the first linear stripe and the second linear stripe.

In some embodiments, each face mask of the plurality of face masks is water resistant.

In some embodiments, each face mask of the plurality of face masks is sized and shaped to cover a user's mouth and a portion of the user's nose.

In some embodiments, each face mask and the corresponding sheet to which the face mask is removably coupled forms a substantially planar unit having a thickness in the range of about 5-20 mils.

In some embodiments, each face mask of the plurality of face masks includes a layer of spunbond polypropylene nonwoven fabric.

In some embodiments, a carrier is coupled to and supports the roll or the fanfold, the carrier includes a shearer configured to contact a first sheet of the plurality of sheets and separate the first sheet of the plurality of sheets from remaining sheets of the plurality of sheets included in the liner.

In another illustrative embodiment, facial barrier assembly includes: a sheet includes a front face and a rear face opposite the front face; a face mask removably coupled to the sheet, the face mask including an interior face coupled to the front face of the sheet and an exterior face opposite the interior face; and an adhesive material positioned between and contacting the front face of the sheet and a first portion of the interior face of the face mask; wherein a second portion of the interior face of the face mask is not in contact with the adhesive material.

In some embodiments, the face mask is sized and shaped to cover: (i) a user's mouth with the second portion of the interior face of the face mask, and (ii) a portion of the user's nose with the first portion of the interior face of the face mask.

In some embodiments, the interior face and the exterior face of the face mask are water resistant.

In some embodiments, the first portion of the interior face of the face mask includes a notch defined therein; and the notch is substantially centered between a first side of the face mask and a second side of the face mask and configured to be aligned with a user's nose.

In another illustrative embodiment, a facial barrier assembly includes: a liner including a series of adjacent of sheets, wherein the adjacent sheets of the liner are coupled together at opposing sides thereof; a barrier coupled to the liner and including a series of adjacent face masks; and a plurality of lines of perforations, wherein each face mask of the series of adjacent face masks is removably coupled to a corresponding sheet of the series of adjacent sheets.

In some embodiments, each perforation extends through the liner, and the lines of perforations define the opposing sides of the adjacent sheets.

In some embodiments, the adjacent face masks of the liner are coupled together at opposing sides thereof; each perforation extends through the barrier and defines the opposing sides of the adjacent face masks.

In some embodiments, the liner and the barrier are arranged as at least one of: (i) a fanfold, and (ii) a roll.

In some embodiments, if the liner is arranged as a fanfold, the liner and the barrier are folded on themselves at, at least some of the plurality of lines of perforations In some embodiments, wherein an adhesive material is positioned between the liner and the barrier.

In some embodiments, each face mask of the series of adjacent face masks is water resistant.

In another illustrative embodiment, a method of manufacturing a facial barrier assembly includes: applying adhesive material to a liner comprised of a first material; adhering a second material to the liner such that the adhesive material is positioned between the liner and the second material; creating boundaries between individual face masks formed of the second material, wherein creating boundaries includes perforating the liner so that the liner includes perforations defined therein.

In some embodiments, the method further includes winding the liner and the second material into a roll.

In some embodiments, the method further includes folding the second material along at least some of the perforations defined therein In some embodiments, the method further includes printing a first indicia on a rear face the liner.

In some embodiments, the method further includes diecutting first and second sides of the liner.

In some embodiments, the method further includes printing a second indicia on an exterior face of the second material opposite the rear face of the liner.

In another illustrative embodiment, a method of using a facial barrier assembly includes: separating a first sheet of a liner having a first face mask coupled thereto from a second sheet of the liner having a second face mask coupled thereto; removing the first face mask from the first sheet; adhering the first face mask to a user's face with an adhesive material previously positioned between the first sheet and the first face mask.

In some embodiments, the method further includes unrolling the first mask and first sheet from a roll in which the first mask and first sheet are arranged.

In some embodiments, the method further includes unfolding the first mask and first sheet from a fanfold in which the first mask and first sheet are arranged.

In some embodiments, the method of separating the first sheet from the second sheet includes shearing (e.g. cutting, or tearing) the first sheet from the second sheet at perforations defining a boundary between the first sheet and the second sheet.

In some embodiments, the method further including removing the first sheet and the first face mask from a carrier; and manually or electronically shearing the first sheet from the second sheet with a shearer of the carrier.

In some embodiments, the method includes coupling a first side of a bottom portion of adhesive material to a second side of the bottom portion of the adhesive material.

In some embodiments, the method includes pulling upward on a portion of the exterior surface of the face mask that abuts the coupled first and second sides of the bottom portion of the adhesive material to remove the mask from the user's face.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1A:
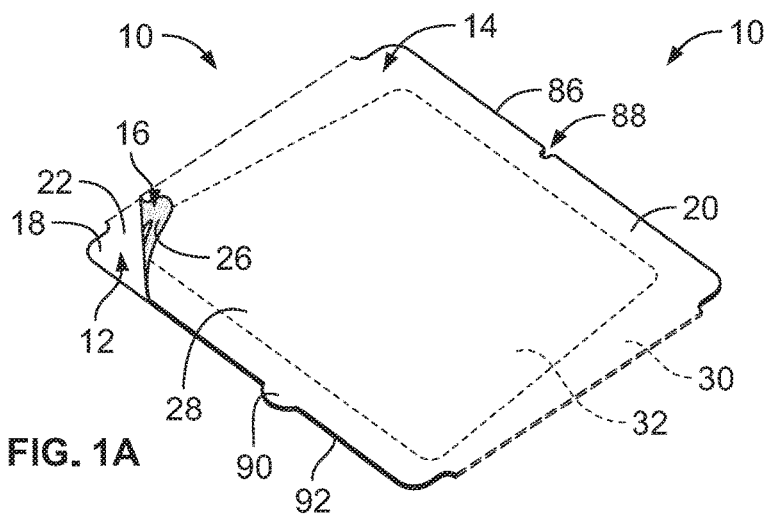
FIG. 1A is a perspective view of a facial barrier assembly including a face mask partially peeled away from a sheet of a liner.
Figure 1B:
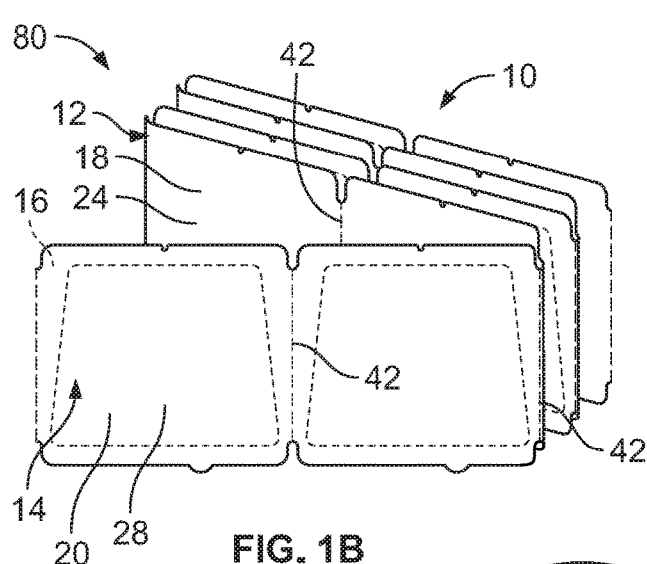
FIG. 1B is a perspective view of the facial barrier assembly in which a plurality of face masks and the liner are arranged as a fanfold.
Figure 1C:
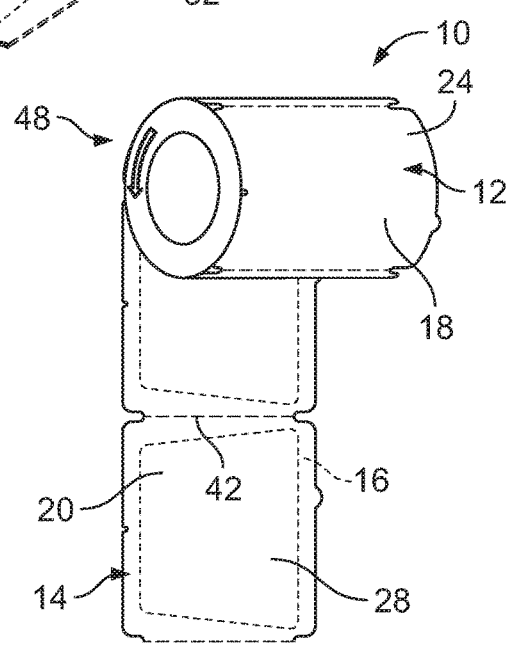
FIG. 1C is a perspective view of the facial barrier assembly in which the plurality of face masks and the liner are arranged as a roll.

FIGS. 1A-C illustrates a facial barrier assembly 10. The facial barrier assembly 10 includes a liner 12, a barrier 14, and adhesive material 16 positioned between the liner 12 and the barrier 14. The liner 12 includes a series of adjacent of sheets 18, one of which is shown in FIG. 1A. The barrier 14 includes a series of adjacent face masks 20, one of which is shown in FIG. 1A. The term adjacent should be understood to mean next to or adjoining. Adjacent components may or may not contact each other as described herein.

FIG. 1A illustrates the face mask 20 partially peeled away from the sheet 18. The sheet 18 includes a front face 22 and a rear face 24 opposite the front face 22 (see FIGS. 1 and 3B). The rear face 24 may include indicia printed thereon such as instructions for use or other information. The front face 22 may be made of a non-stick material such as silicon or another suitable material. The face mask 20 includes an interior face 26 facing and contacting the front face 22 of the sheet 18. The face mask 20 also includes an exterior face 28 opposite the interior face 26. The exterior face 28 may include indicia printed thereon such as, for example, ornamental features, patterns, or designs.

The face mask 20 is formed of a water resistant material. For example, the face mask 20 may be formed of a spunbond polypropylene nonwoven fabric. The adhesive material 16 adheres more so to the face mask 20 than to the sheet 18. Thus, as shown in FIG. 1, when the face mask 20 is partially peeled away from the sheet 18, adhesive material 16 remains in contact with the face mask 18 and is separated from the sheet 18. It should be appreciated that a corner of the adhesive material 16 is visible in FIG. 1, and the remaining portions of the adhesive material 16 are shown with phantom lines.

When the face mask 20 is coupled to the sheet 18, the adhesive material 16 is positioned between the face mask 20 and the sheet 18. The face mask 20, the sheet 18, and (in some places) the adhesive 16 form a substantially planar unit having a thickness in the range of about 5-20 mils.

In this arrangement, the adhesive material 16 is in contact with and positioned between the front face 22 of the sheet 18 and the interior face 26 of the face mask 20. A first portion 30 of the interior face 26 is in contact with the adhesive material 16, and a second portion 32 of the interior face 26 is not in contact with the adhesive material 16, as show in FIGS. 2A-C.

The adhesive material 16 may be, for example, a polymeric adhesive intended to be used in medical devices and other similar devices or assemblies intended for skin contact. For example, the adhesive material 16 may be a hot melt adhesive.

Figure 2A:
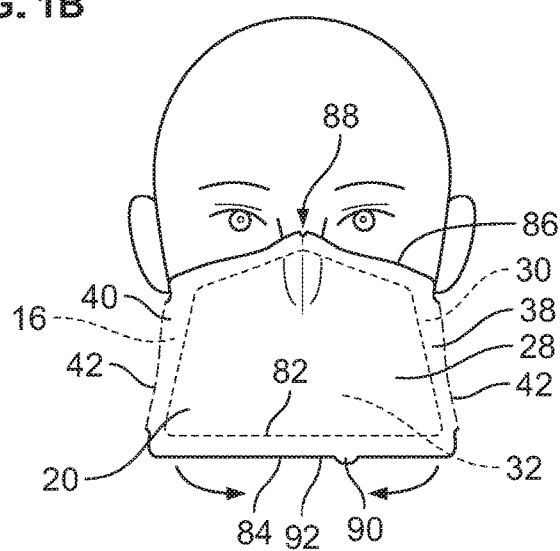
FIG. 2A is a front view of a user putting on the face mask of FIG. 1C, with adhesive material coupled to the face mask shown in phantom.
Figure 2B:
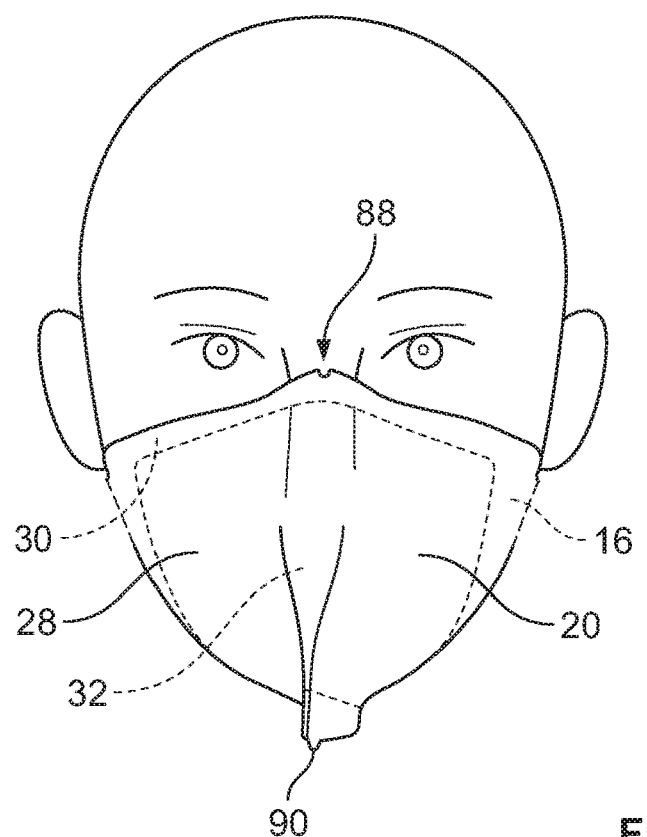
FIG. 2B is a front view of the user wearing the face mask with a bottom portion of adhesive material coupled to itself.
Figure 2C:
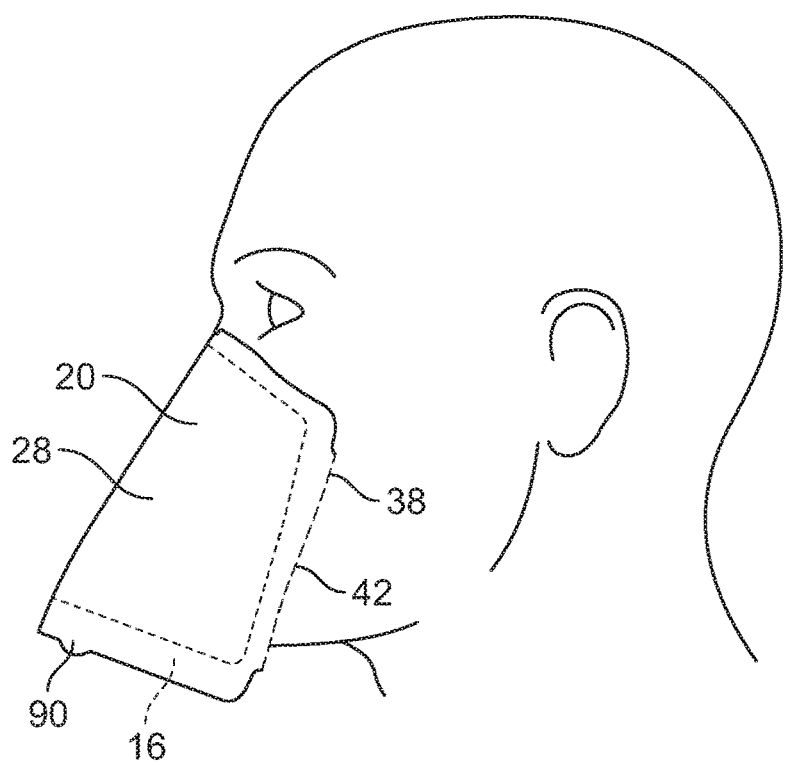
FIG. 2C is a side view of the user wearing the face mask showing an optional adhesive bump configured to be coupled to an exterior face of the face mask.

As shown in FIGS. 2A-C, the face mask 20 is sized and shaped to cover a user's mouth and a portion of the user's nose, and specifically, at least the nostrils of a user's nose. Each face mask 20 of a given facial barrier assembly 10 is commonly sized. Each different facial barrier assembly 10 may be provided with different commonly sized face masks 20. For example, assemblies 10 may include: small, medium, large, and extra-large commonly sized face masks 20; wide, narrow, tall, short, and regular commonly sized face masks 20; or men's, women's, and children's commonly sized face masks 20, etc.

The face mask 20 may be a single layer of material as illustratively shown in FIG. 1A. In some embodiments, the face mask 20 may include multiple layers of material. For example, in some embodiments, the face mask 20 may be a multi-layer, single-use (or multi-use), disposable respiratory protective device. The multi-layer mask may, in some embodiments if properly certified for such use, be used in a healthcare setting and worn by healthcare personnel during procedures to protect both the patient and the healthcare personnel from the transfer of microorganisms, body fluids, and particulate material. For example, the face mask 20 may include multiple layers or plies of materials that form a composite material laminate that is used to cover the nose and mouth of a user. The multiple layers may be different nonwoven fabric materials.

Referring again to FIGS. 1 and 2A, in use, the interior face 26 of the face mask 20 faces the user's face, and the exterior face 28 of the face mask 20 faces away from the user's face. The face mask 20 does not include any strings, bands, or other materials wrapped around or otherwise tensioning the user's ears. The first portion 30 of the face mask 20 (which contacts adhesive 16) is configured to cover a portion of a user's nose, preferably the bridge of the nose, and the second portion 32 of the face mask 20 (which does not contact adhesive 16) is configured to cover a user's mouth. This arrangement prevents ingestion or undesired oral contact with the adhesive material 16. The adhesive material 16 may be arranged in a variety of useful patterns on the face mask 30, which will be described in greater detail below.

Figure 3A:
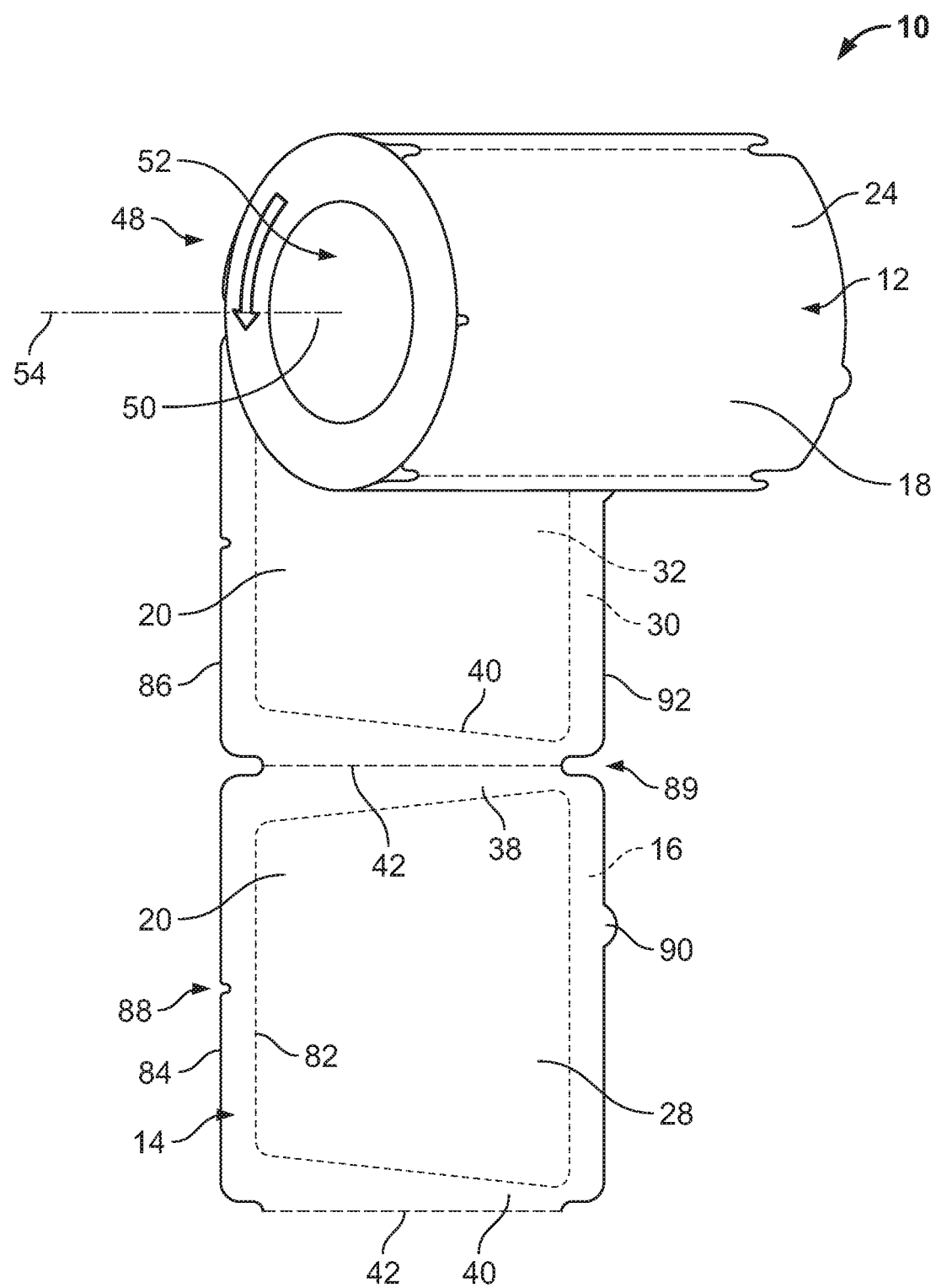
FIG. 3A is a front perspective view of the facial barrier assembly of FIG. 1A, showing a series of distinct sheets included in the liner and a series of distinct face masks included in a barrier, with the liner and the barrier arranged as a roll.
Figure 3B:
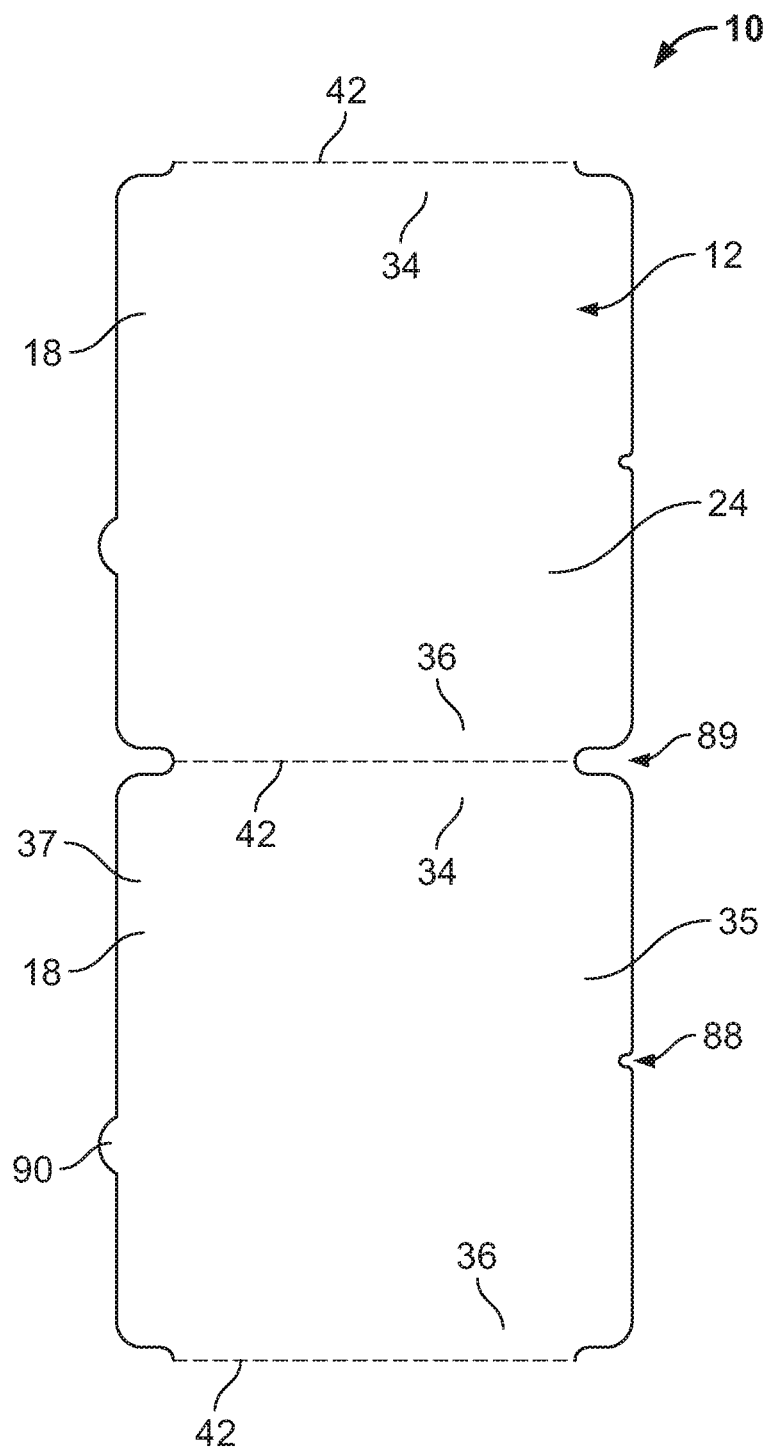
FIG. 3B is a rear perspective view of a portion of FIG. 3A.

Referring now to FIG. 3B, the liner 12 includes a plurality or a series of adjacent sheets 18. The adjacent sheets 18 are distinct from one another. In the illustrative embodiment, the adjacent sheets 18 contact and abut one another, and the adjacent sheets 18 are coupled to each other at opposing sides of one another. For example, each sheet 18 includes a first side 34 and a second side 36 opposite the first side 34. As shown in FIG. 3B, the second side 36 of a first adjacent sheet 18 is coupled to the first side 34 of a second adjacent sheet 18. Each sheet also includes a top side 35 and a bottom side 37 opposite the top side 35.

Similarly, as shown in FIG. 3A, the barrier 14 includes a plurality or series of adjacent face masks 20. In the illustrative embodiments shown in FIGS. 1-7 and directed to assembly 10, the adjacent face masks 20 contact and abut one another, and the adjacent face masks 20 are coupled to each other at opposing sides of one another. For example, each face mask 20 includes a first side 38 and a second side 40 opposite the first side 38. As shown in FIG. 3A, the second side 40 of a first adjacent face mask 20 is coupled to the first side 38 of a second adjacent face mask 20.

As shown in FIGS. 3A-B, the facial barrier assembly 10 includes a plurality of lines of perforations 42. In the illustrative embodiment, each perforation extends through the liner 12 and the barrier 14. Each line of perforations 42 is defined along the opposing sides 34, 36 of the adjacent sheets 18 (see FIG. 3B) and the opposing sides 38, 40 of the adjacent face masks 20 (see FIG. 3A). In other words, the lines of perforations 42 are defined along the first side 34 and the second side 36 of each sheet 18, and the lines of perforations 42 are defined along the first side 38 and the second side 40 of each face mask 20.

The lines of perforations 42 define linear boundaries between distinct adjacent face masks 20 and linear boundaries between distinct adjacent sheets 18. While conventional adhesive athletic tape or similar material may be unrolled and subsequently cut into separate pieces, the liner 12 and the barrier 14 are pre-perforated, and therefore, distinguished from conventional adhesive athletic tape in this way, among others. In other words, the liner 12 is divided into distinct sheets 18 and the barrier 14 is divided into distinct face masks 20 by the perforated lines 42 while being arranged as a roll 48 or a fanfold 80, as described in greater detail below.

As shown in FIG. 1C, in some embodiments, the liner 12 and the barrier 14 are arranged as a roll 48. What is meant by a roll is a cylinder comprising wound layers of the liner 12 and the barrier 14 arranged such that the liner 12 and the barrier 14 are not folded. In the illustrative embodiment, as shown in FIG. 3A, the liner 12 and the barrier 14 are wound about a tube 50; however, in other embodiments, the liner 12 and the barrier 14 are wound about themselves rather than a tube 50. In any event, an opening 52 is formed with a central axis 54 of the roll 48 passing therethrough. In the illustrative embodiment, the exterior faces 28 of a first wound layer of the roll 48 abut the rear faces 24 of a second wound layer of the roll 48. The second wound layer of the roll 48 is positioned radially inward of the first wound layer in this case. The roll 48 is configured to rotate about the central axis 54 to move additional face masks 20 away from the roll 48 to be made available to a user.

Figure 7:
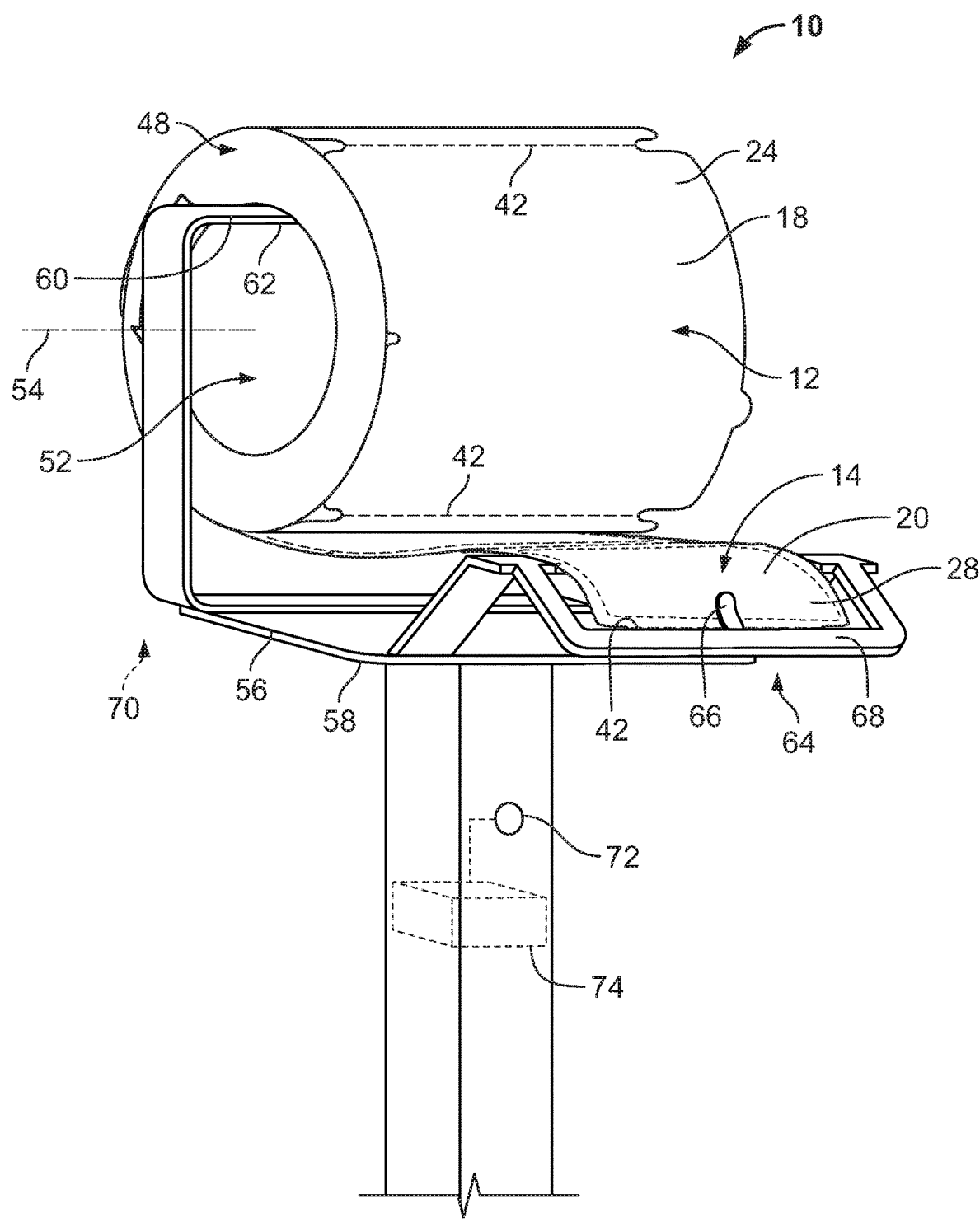
FIG. 7 is a perspective view of the liner and the barrier arranged as a roll and coupled to a carrier having a shearer.

In some embodiments, as shown in FIG. 7, the facial barrier assembly 10 includes a carrier 56 to facilitate access to and distribution of the sheets 18 and the face masks 20. In some embodiments, the carrier 56 is a stand 58. The stand 58 supports the roll 48 above the ground and facilitates rotation of the roll 48 to provide access to additional sheets 18 and face masks 20 of the roll 48. In some embodiments, the stand 58 includes a mount 60 aligned with the opening 52 formed in the role 48. In some embodiments, the mount 60 includes an arm 62 that extends through the opening 52 to contact, support, and facilitate rotation of the roll 48 about its central axis 54.

In some embodiments, the carrier 56 is a dispenser 70. The dispenser 70 houses the roll 48 and facilitates rotation of the roll 48 to move additional sheets 18 and face masks 20 out of the dispenser 70, such that they may be accessed by a user. The dispenser 70 may include the mount 60 and the arm 62 therein.

The carrier 56, whether a stand 58 or a dispenser 70, includes a shearer 64 configured to separate adjacent sheets 18 from one another and to separate adjacent face masks 20 from one another. For example, the shearer 64 engages a perforated line 42 to separate one or more sheets 18 and to separate one or more face masks 20 from the roll 48. In some embodiments, the shearer 64 is a fixed, manually-operated shearer 64 including tab 66 which is configured to puncture the liner 12 and the barrier 14 along the perforated line 42 when pressure is applied on the tab 66 via the liner 12 or the barrier 14. In other embodiments, the shearer 64 is a manually or automatically operated row of teeth 68 configured shear (e.g., cut, tear, or otherwise separate) the adjacent sheets 18 and face masks 20 from one another. In manual use, pressure is applied on a fixed row of teeth 68 via the liner 12 or the barrier 14.

In automatic operation of the shearer 64, a sensor 72 may be included in the carrier 56. The sensor 72 may be a motion sensor 72 configured to identify the presence of a user's hand or the like passing by the carrier 56. The sensor 72 may send a signal indicative of the sensed motion to a controller 74 operatively coupled to the sensor 72. In response to receiving the signal, the controller 74 may cause an actuator 76 urge the teeth 68 into the barrier 14 and the liner 12. The controller may also cause an actuator 78 to rotate the roll 48 to dispense a recently severed sheet 18 and face mask 20, so that a user may easily remove the dispensed sheet 18 and face mask 20 from the roll 48. The process described increases or preserves sanitization of the face mask 20 delivery process. For example, a user only touches the face mask 20 that he/she intends to use when a carrier 56 is provided with the facial barrier assembly 10.

As shown in FIG. 1B, in some embodiments, the liner 12 and the barrier 14 are arranged as a fanfold 80 in which the liner 12 and the barrier 14 are folded on themselves at, at least some of the plurality of lines of perforations 42. For example, the rear face 24 of a first sheet 18 faces the rear face 24 of a second sheet 18. A second face mask 20 is coupled to the second sheet 18, and the exterior face 28 of the second face mask 20 faces the exterior face 28 of a third face mask 220.

The fanfold 80 may be arranged to have folds at every other line of perforations 42, as shown in the illustrative embodiment. In other embodiments, the fanfold 80 may be folded at each line of perforations 42, or with some other patterned frequency of folding.

The fanfold 80 is configured for use with the carrier 56. For example, the fanfold 80 may be housed in the dispenser 70. When a user pulls a first face mask 20 and a first sheet 18 from the dispenser 70, a second face mask 20 and a second sheet 18 are pulled into a position where they are now accessible by the user. The user (or the controller-controlled actuator 76) may urge the perforations 42 into contact with the shearer 64.

As described above, adhesive material 16 may be arranged in a variety of useful patterns, and each pattern promotes effective adhesion to a user's face and helps to avoid undesired interactions with the adhesive material 16, such as oral contact.

For example, as shown in FIGS. 1-4, the adhesive material 16 is shaped as a continuous loop. The loop of adhesive material 16 extends from an inner edge 82 to an outer edge 84. In the illustrative embodiment shown in FIGS. 1-3, the outer edge 84 circumscribes the perimeter of the face mask 20. As best seen in FIG. 2B, a user's mouth is covered with the second portion 32 of the face mask 20, which, in this case, is defined inside the inner edge 82 and devoid of adhesive material 16.

As suggested by FIGS. 1A and 2A, in use, the face mask 20 has been removed from the sheet 18 to which it was previously coupled. A top side 86 of the face mask 20 includes a notch 88 defined therein and extending into the adhesive material 16. The notch 88 is aligned with the nose, and the top side 86 of the face mask 20 is positioned below the eyes. A top portion of the adhesive material 16 may be urged against the user's face below the eyes. Side portions of the adhesive material 16 may be urged against the user's face such that outer ends of a bottom portion of the adhesive material 16 are brought together as suggested by the arrows in FIG. 2A. Opposite sides of the bottom portion of the adhesive material 16 be may pressed together to form a seal as shown in FIG. 2B.

In some embodiments, the face mask 20 includes a bump 90 positioned at a bottom side 92 of the face mask 20. The bump 90 may have adhesive material 16 thereon. A user may couple the bump 90 to the exterior face 28 of the face mask 20.

Figure 4:
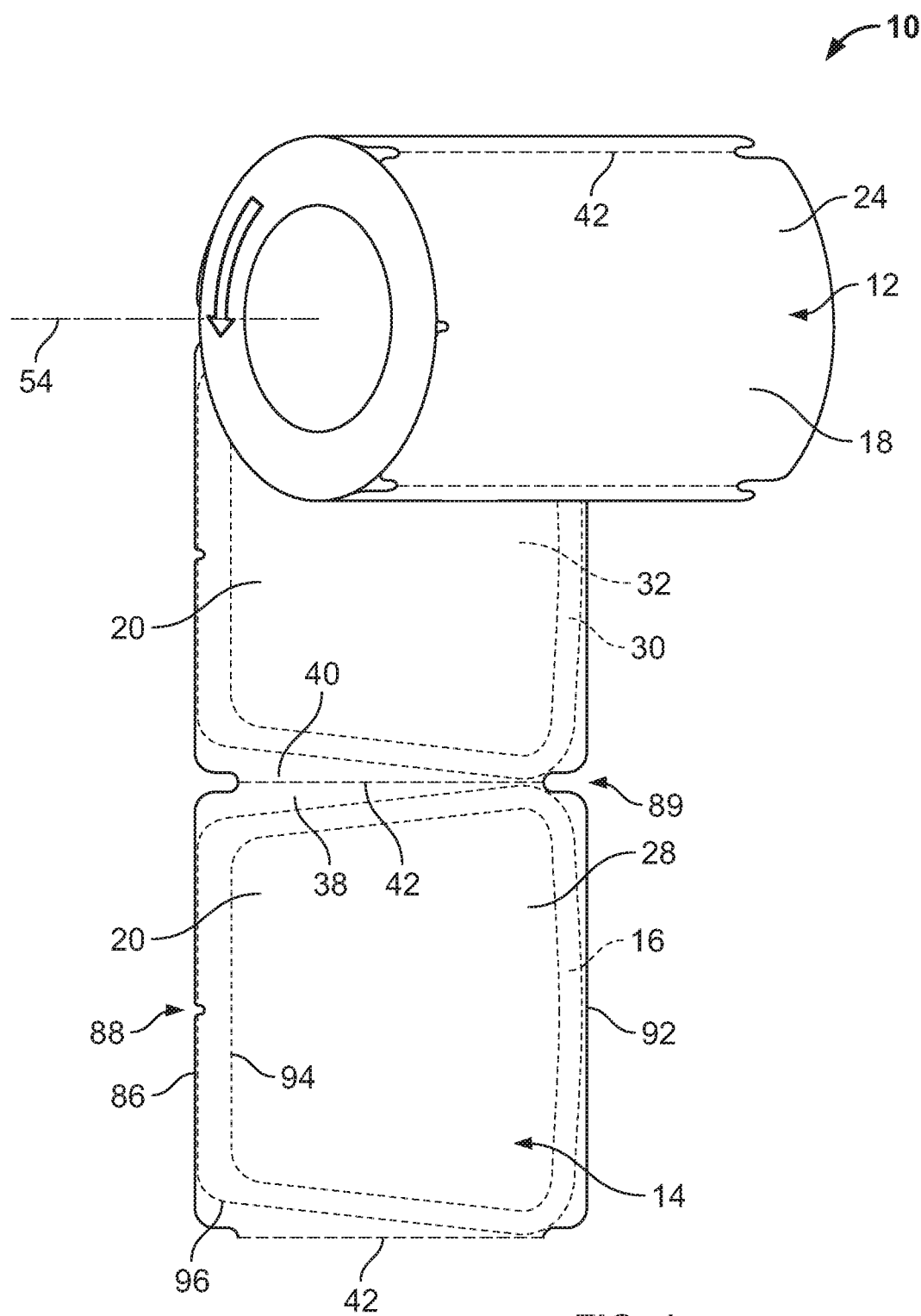
FIG. 4 is a perspective view of a facial barrier assembly similar to FIG. 1A, showing an adhesive pattern different than the adhesive pattern of FIGS. 1-3.

In the illustrative embodiment shown in FIG. 4, the adhesive material 16 is loop shaped including an inner perimeter 94 and an outer perimeter 96. The outer perimeter 96 is set in from the perimeter of the face mask 20. It should be appreciated that looped shaped includes any shape that has a continuous perimeter such as trapezoidal, rectangular, circular, or oval shaped, to name a few.

The unique arrangements of the adhesive material 16 shown in FIGS. 1-4 can be achieved using a manufacturing process involving a coater as will be described in greater detail below.

During manufacturing, in some embodiments, the liner 12 may be cut from a first width to a second lesser width. At this point, the cut liner 12 is a continuous roll of material fed toward a rolling printer plate. The plate is continuously refreshed with ink and reengaged with the liner 12 to print indicia onto the rear face 24 of each sheet-to-be 18' of the liner 12. The now-printed-on sheets-to-be 18' of the liner 12 are turned over (180 degrees) by a turn bar mechanism so that their front faces 22 are facing upward. It should be appreciated that the sheets-to-be 18' are illustrated as sheets 18 in the final formed assembly 10.

In embodiments including stripes of adhesive material 16 extending in a single direction (see FIGS. 5-6 and 8-10), the adhesive material 16 is provided to the front faces 22 of each sheet-to-be 18' of the liner 12 via a plurality of heads. The heads apply a thin layer of adhesive arranged as a stripe as the liner 12 passes by the heads. It should be appreciated that additional heads may be added to the manufacturing line so that several liners 12 may receive adhesive 16 simultaneously.

In embodiments including loop shaped or other non-striped arrangements of adhesive material 16 (FIGS. 1-4 and 7), a rolling coater is used to apply the desired adhesive arrangement to the front faces 22 of each sheet-to-be 18' of the liner 12. It should also be appreciated that the coater may include several adhesive-applying lanes, so that several liners may be coated with adhesive 16 simultaneously. It should be appreciated that whether using the rolling coater or the heads, the adhesive material is applied inline as a fluid, rather than added as a continuous solid or tape-type material.

Subsequent to the adhesive 16 being applied to the liner 12, the barrier 14 is nipped or rolled onto the liner 12. The liner 12 and the barrier 14 are adhered together by the adhesive material 16. The barrier 14 is removably coupled to the liner at this point because the adhesive material 16 adheres less to the silicon liner 12 than it does to the spunbond polypropylene barrier 14.

The sheets-to-be 18' and face-masks-to-be 20 which are now removably coupled together (via the adhesive 16) are moved toward a rolling die cutter. The die cutter may be arranged as a metal-to-metal die cutter to effectively cut through the spunbond polypropylene nonwoven material or other material of the barrier 14. The sheets-to-be 18' and face-masks-to-be 20 are die cut to include the nose notch 88 and indentations 89 aligned with the perforated lines 42. The excess liner 12, adhesive 16, and barrier 14 on the top side 86 and the bottom side 92 of the face-mask-to-be 20 is removed from the facial barrier assembly 10 as waste.

The liner 12 and the barrier 14 are die cut a second time to perforate the liner 12 and the barrier 14. The liner 12 and the barrier 14 are subsequently wrapped about themselves without folding to form the roll 48. A discussed above, in some embodiments, the liner 12 and the barrier 14 are folded back and forth at predetermined perforation lines 42 to form a fanfold rather than a roll 48.

Figure 5:
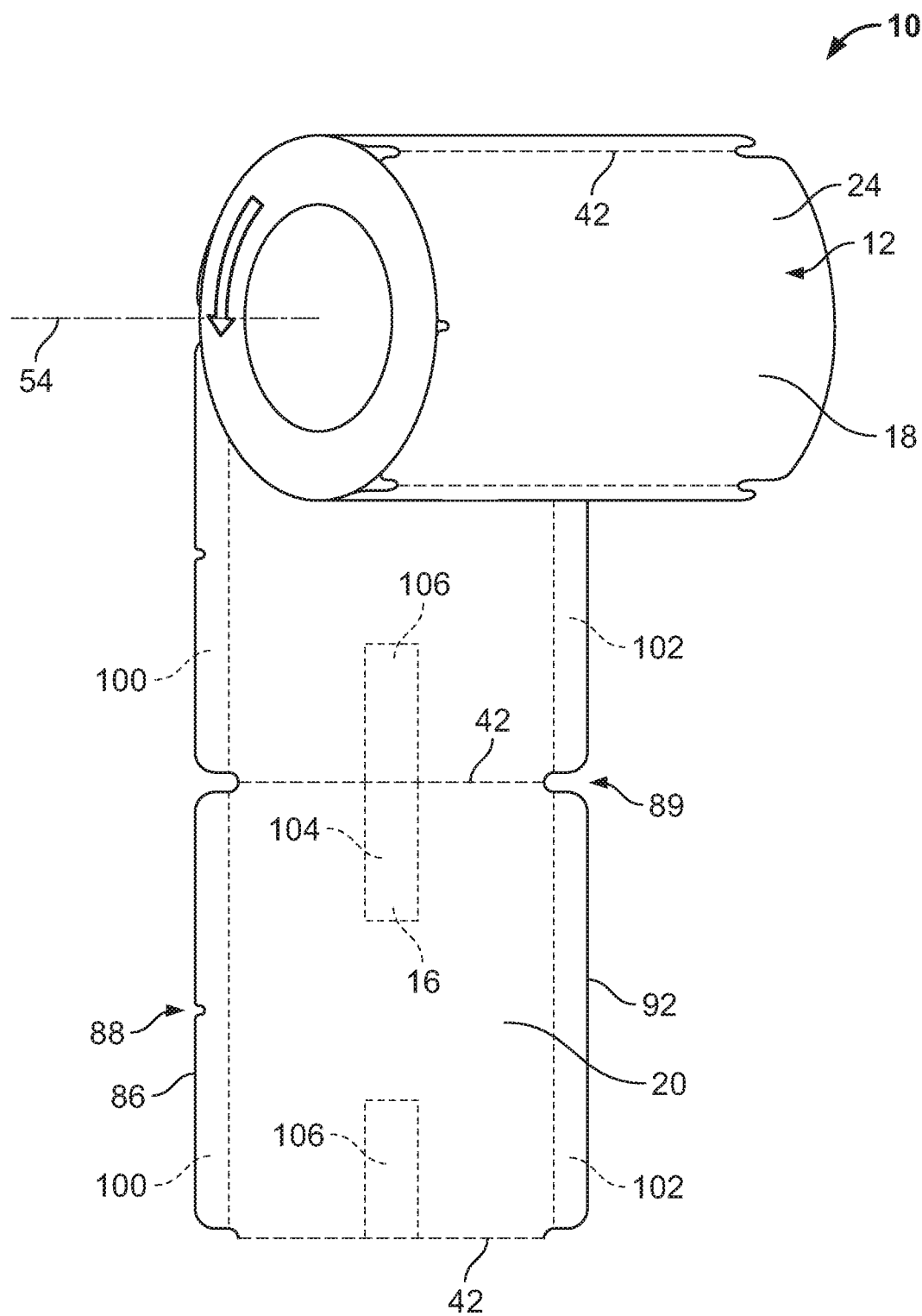
FIG. 5 is a perspective view of a facial barrier assembly similar to FIG. 1A, showing an adhesive pattern different than the adhesive patterns of FIGS. 1-3 and 4.

FIG. 5 illustrates another arrangement of the adhesive material 16. A first stripe 100 of adhesive material 16 is positioned along the top side 86 of the face mask 20. A second stripe 102 of adhesive material 16 is positioned along the bottom side 92 of the face mask 20. A pair of middle stripes 104, 106 of adhesive material 16 is positioned between the first stripe 100 and the second stripe 102, and the middle stripes 104, 106 are aligned with each other and equal each other in width.

It should be appreciated that the stripes 100-106 are created by the heads described above in the manufacturing process. For example, a first head applies adhesive material 16 to form the first stripe 100, a second head applies adhesive material 16 to form the second stripe 102, and a third head applies adhesive material 16 to form the pair of middle stripes 104, 106.

Figure 6:
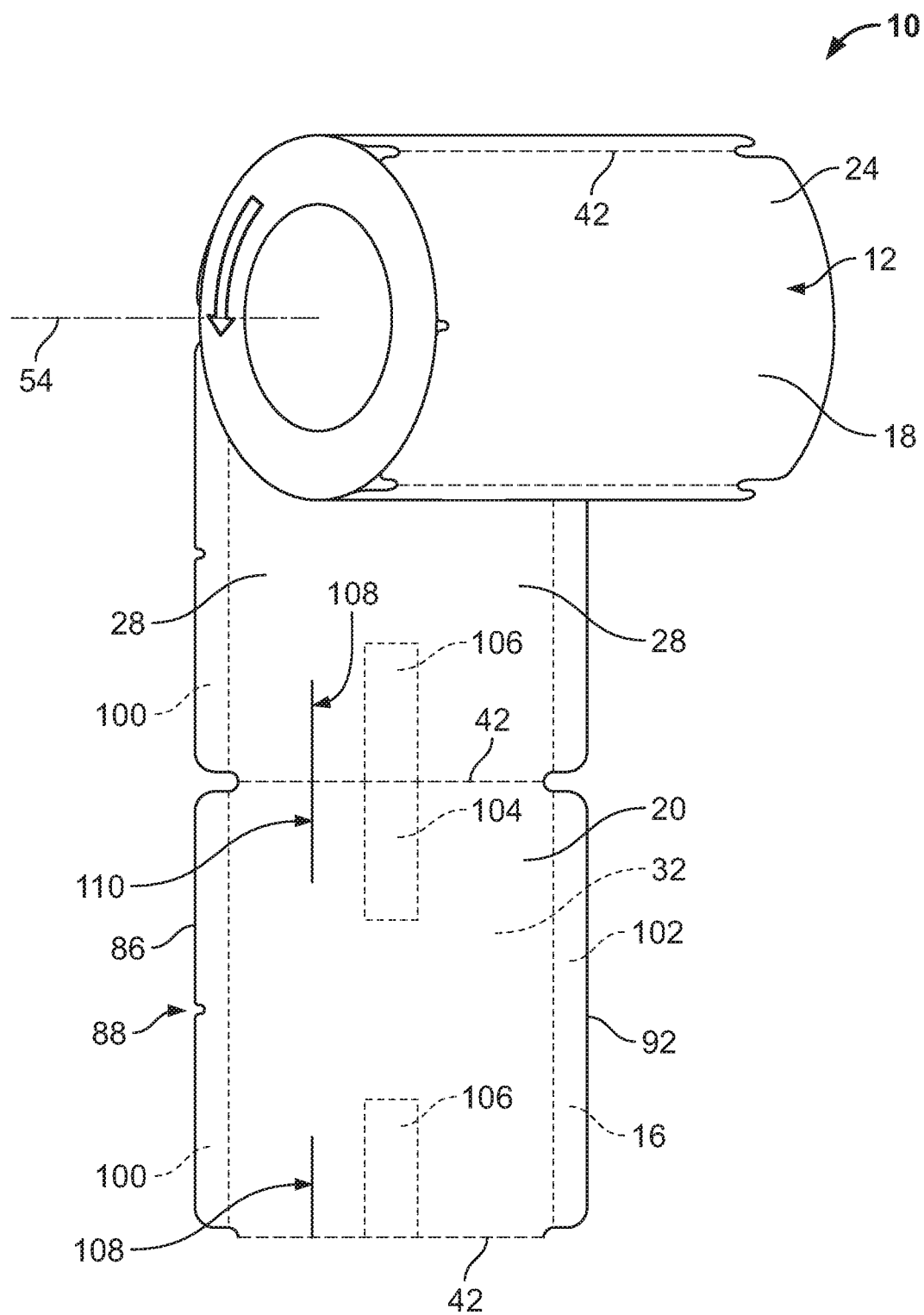
FIG. 6 is a perspective view of a facial barrier assembly similar to FIG. 5, showing a face mask having slits formed therein to facilitate an improved fit of the face mask to the user's face.

As shown in FIG. 6, each face mask 20 may include a pair of aligned slits 108, 110 formed therein. The slits 108, 110 are positioned between the middle stripes 104, 106 and the first stripe 100 in the illustrative embodiment shown in FIG. 6. The slits 108, 110 are not limited to embodiments based on the arrangement of adhesive material 16, and instead may be included with any arrangement of adhesive material 16. The slits 108, 110 allow portions of the interior and exterior faces 26, 28 of the face mask 20 to move past each other when the face mask 20 is adhered to a user's face. In this case, the second stripe 102 (or other bottom portion of the adhesive material 16) may be adhered to the user's face (rather than adhered to itself as suggested in FIGS. 2A-C).

Figure 8:
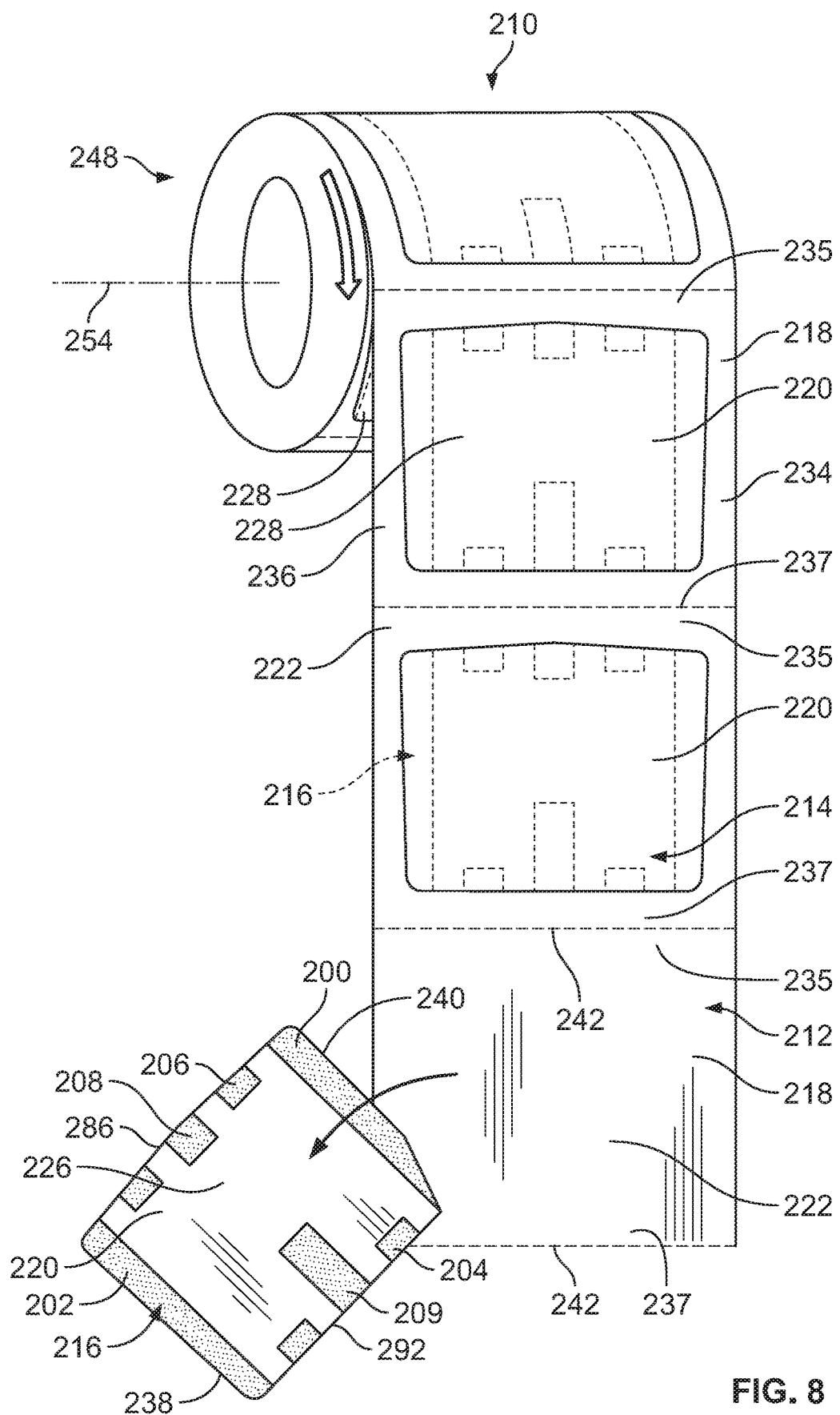
FIG. 8 is a perspective view of another facial barrier assembly, showing that face masks of the facial barrier assembly are spaced apart from each other, and showing that distinct sheets of a liner are coupled to each other at opposing top and bottom sides.

FIG. 8 illustrates a facial barrier assembly 210 including a liner 212 and a barrier 214. The liner 212 includes a series of distinct sheets 218. Each sheet 218 is coupled to an adjacent sheet 218 of the series at opposing sides thereof. A barrier 214 is coupled to the liner 212 and includes a series of distinct face masks 220. Each face mask 220 is removably coupled to a corresponding sheet 218.

FIG. 8 illustrates an embodiment of the facial barrier assembly 210 arranged in a roll 248. Several aspects of the facial barrier assembly 210 are different from the commonly-named aspects described with respect to the facial barrier assembly 10. Thus, it should appreciated that any of the differing commonly-named aspects of the facial barrier assembly 10 may be applied to the facial barrier assembly 210 and vice versa. Other aspects of the facial barrier assembly 210 are the same as those described with respect to the facial barrier assembly 210, as may be apparent based on the drawings.

Sheets 218 shown in FIG. 8 each include a top side 235, a bottom side 237, a first side 234, and a second side 236. However, perforated lines 242 are defined along the top side 235 and the bottom side 237 in the assembly 210, rather than along the first side 34 and the second side 36 as with assembly 10. Thus, the lines of perforations 242 define the opposing sides (or the top and bottom sides 235, 237) of the sheets 218. Thus, while adjacent sheets 18 of the liner 12 are coupled to one another at first and second sides 34, 36, adjacent sheets 218 of the liner 212 are coupled to one another at the top and bottom sides 235, 237 of the sheets 218. It should also be appreciated that each perforation extends through the liner 212 but not the barrier 214, as will be described in greater detail below.

As shown in FIG. 8, adjacent face masks 220 do not abut one another. Instead, the adjacent face masks 220 are spaced apart from one another. In other words, the face masks 220 of the facial barrier assembly 210 have a smaller perimeter than the perimeter of the corresponding sheets 218. Thus, in the facial barrier assembly 210, a portion of a front face 222 of each sheet 218 is visible when the face mask 220 is coupled to the sheet 218 (see FIG. 8).

Figure 10:
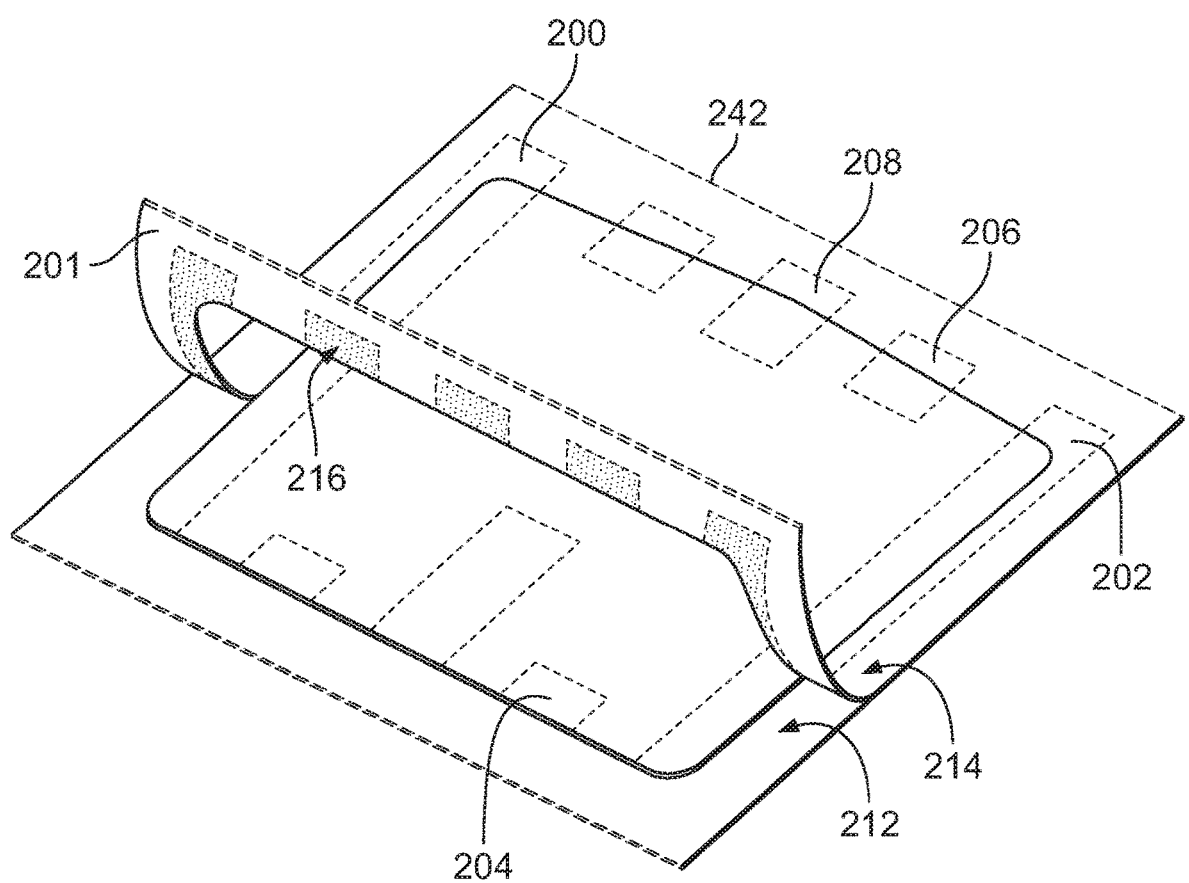
FIG. 10 is a perspective view of a sheet and a face mask similar to FIG. 8, with a waste portion of a barrier and the adhesive coupled to the barrier partially peeled away from the sheet.

As shown best in FIG. 10, prior to being arranged as a roll 248 (or as a fanfold 280, as described below), a waste portion 201 of the barrier 214 may be removed from the liner 212. The waste portion 201 results from differences the in manufacturing process used to create the assembly 210 (relative to the manufacturing process described for assembly 10).

Figure 9:
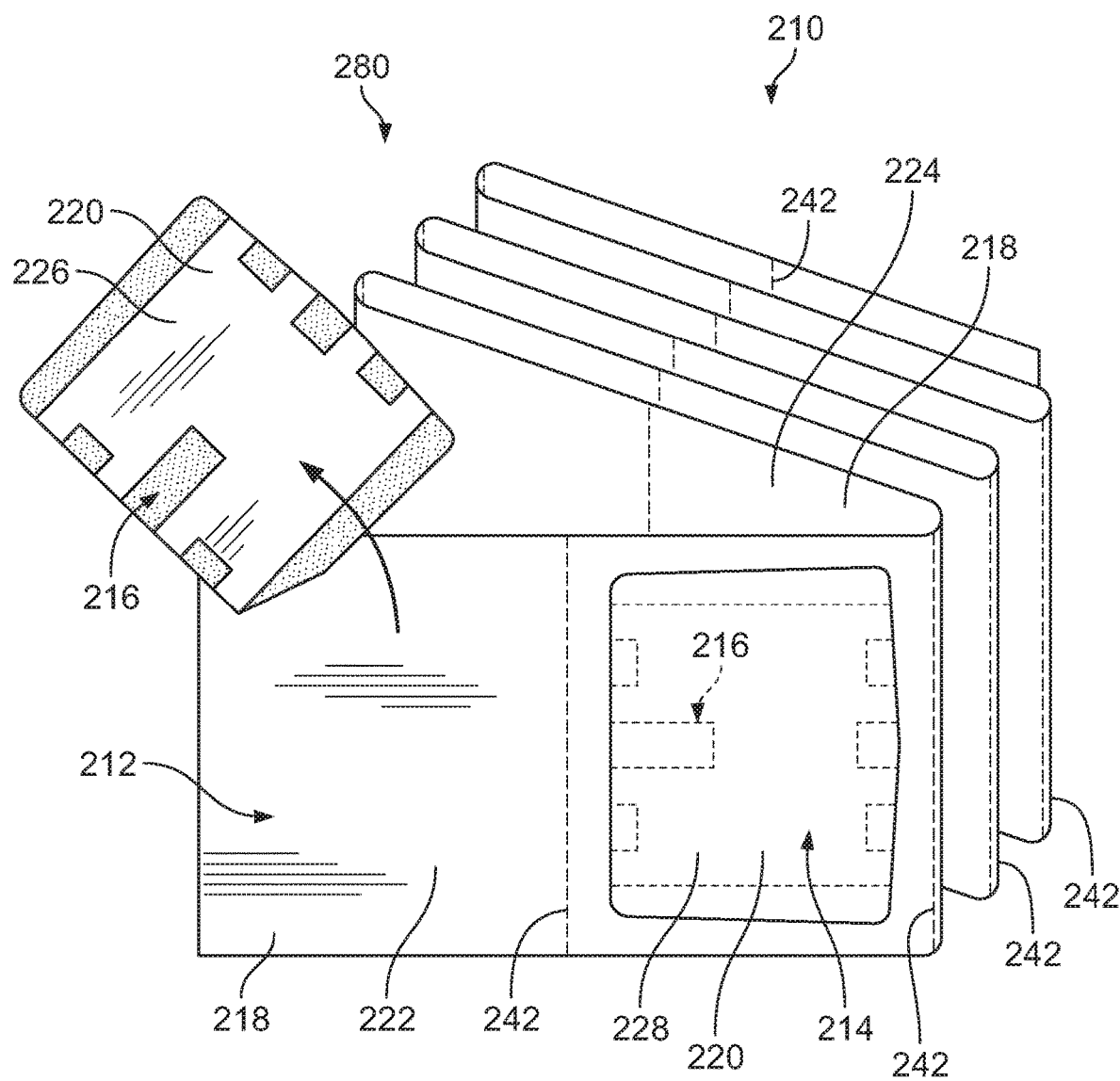
FIG. 9 is a perspective view of the liner and the face masks of FIG. 8 arranged as a fanfold.

While the process of manufacturing the assembly 10 includes using a metal-to-metal die cutter to cut through the barrier 14 and the liner 12, the process for manufacturing the assembly 210 differs. For example, after the barrier 214 is nipped to the liner 212, the barrier 214 is die cut; however, the die cutter does not cut the liner 212. In the illustrative embodiment, adhesive material 216 is also cut by the die cutter in the same shape as the barrier 214. Thus, as shown in FIG. 9, the waste portion 201 of the barrier 214 (and the adhesive 216) may be removed from the liner 212 prior to the liner 212 and the face masks 220 being arranged as the roll 248 (or as the fanfold 280, which will be described in greater detail below). It should be appreciated that, subsequent to die cutting the barrier 214 to form the waste portion 201, the liner 212 is die cut to form the lines of perforations 214.

Referring again to FIG. 8, the facial barrier assembly 210 includes a plurality adhesive stripes. However the plurality of adhesive stripes are arranged to be vertically extending stripes when the face mask 210 is adhered to a user's face, rather than horizontally extending strips as described with respect to FIGS. 6 and 7 for the assembly 10. The plurality of stripes of the facial barrier assembly 210 include a first elongated stripe 200, a second elongated stripe 202, a two pairs of truncated stripes 204, 206 (each truncated stripe being aligned with the other truncated stripe of its pair), and a pair of middle stripes 208, 209.

FIG. 8 illustratively shows an interior side 226 of the face mask 220 being peeled away from the front side 222 of the sheet 218. The first middle stripe 208 of adhesive 216 is positioned at a top side 286 of the face mask 220 and configured to be adhere to the nose, and the second middle stripe 209 is positioned at a bottom side 292 of the face mask 220 and configured to be adhered to the chin. The first middle stripe 208 is shorter than the second middle stripe 209 based on the features of a typical user's face. The first elongated stripe 200 and the second elongated stripe 202 are positioned on the first side 238 and the second side 240 of the face mask 220. The pairs of truncated stripes 204, 206 are positioned under the eyes and near or on the jaws, respectively, to provide additional adhesion. The face mask 210 and the vertical stripes of adhesive material 216 may be peeled away from the liner 212, as shown in FIG. 8.

Referring still to FIG. 8, while exterior faces 28 of the face masks 20 face toward the central axis 54 of the roll 48, the exterior faces 228 of the face masks 220 face away from a central axis 254 of the roll 248. In the illustrative embodiment, the exterior faces 228 of a first wound layer of the roll 248 abut rear faces 224 of a second wound layer of the roll 248. The second wound layer of the roll 248 is positioned radially outward of the first wound layer in this case.

As shown in FIG. 9, in some embodiments, the liner 212 and the barrier 214 are arranged as a fanfold 280 in which the liner 212 and the barrier 214 are folded on themselves at, at least some of the plurality of lines of perforations 242. For example, the rear face 224 of a first sheet 218 is facing the rear face 224 of a second sheet 218. A second face mask 220 is coupled to the second sheet 218, and the exterior face 228 of the second face mask 220 is facing the exterior face 228 of a third face mask 220.

The fanfold 280 may be arranged to have folds at every other line of perforations 242, as shown in the illustrative embodiment. In other embodiments, the fanfold 280 may be folded at each line of perforations 242, or with some other patterned frequency of folding.

The fanfold 280 is configured for use with the carrier 56. For example, the fanfold 280 may be housed in the dispenser 70. When a user pulls a first face mask 220 and a first sheet 218 from the dispenser 70, a second face mask 220 and a second sheet 218 are pulled into a position where they are now accessible by the user. The user (or the controller-controlled actuator 76) may urge the perforations 242 into contact with the shearer 64.

It should be appreciated that the assembly 10 lacks the notch 88, the bump 90, and the indentations 89. This is, in part, due to the differences in manufacturing and resulting differences in arrangement of the effected components. For example, the face masks 220 are set in from the perimeter of the sheets 218; therefore, die cutting the above-mentioned features from the sheets 218 would have no effect on the shape of the face masks 220. In some embodiments, the indentations 89 may still be die cut into the sheets 218 to assist in tearing the sheets 218 away from one another at the perforation lines 242.

As described above, it should be appreciated that any of the differing aspects of the facial barrier assembly 10 may be applied to the facial barrier assembly 210 and vice versa. This includes: among other things, (i) the inclusion of indentations 89; (ii) the differing locations of the perforations relative to the sides of the sheets and face masks, (i.e. coupling of sheets 220 to one another at top and bottom sides 235, 237 rather than first and second sides 38, 40); (iii) vertically arranged rather than horizontally arranged stripes of adhesive material; (iv) orientation of exterior faces relative to central axes of rolls 48, 248; (v) set-in perimeter of face mask 220 relative to sheet 218 versus perimeter of face mask 20 matching perimeter of sheet 18; and (vi) associated manufacturing and method of use differences described and suggested herein.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A facial barrier assembly comprising:
a liner including a plurality of sheets, wherein each sheet of the plurality of sheets is coupled to at least one additional sheet of the plurality of sheets, wherein: (i) each sheet of the plurality of sheets includes a first side and a second side opposite the first side, (ii) each sheet of the plurality of sheets includes a top side and a bottom opposite the top side, (iii) the top side and bottom side of the plurality of sheets are perpendicular to the first side and the second side of the plurality of sheets, (iv) the top side of each sheet has a greater length than the first side and the second side of each sheet, and (v) each sheet of the plurality of sheets is coupled to an adjacent sheet of the plurality of sheets at the first side or the second side of the adjacent sheet;
a plurality of face masks, wherein each face mask of the plurality of face masks is removably coupled to a corresponding sheet of the plurality of sheets;
an adhesive material positioned between each face mask and the corresponding sheet to which each face mask is removably coupled, wherein the adhesive material includes a first linear stripe positioned at a top side of each face mask that is configured to be positioned under a user's eyes and on the user's nose, wherein the top side of each face mask is aligned with the top side of the corresponding sheet to which each face mask is removably coupled; and one or more perforations that extend through the liner and are defined along the first side and the second side of each sheet to define linear boundaries between adjacent sheets of the plurality of sheets along first and second sides of the adjacent face masks; and wherein the plurality of sheets and the plurality of face masks are in an arrangement of at least one of: (i) a fanfold wherein the liner is folded on itself, and (ii) a cylindrical roll wherein the liner is wrapped about itself without folding.

2. The facial barrier assembly of claim 1, wherein the adhesive material is in contact with the face mask and spaced apart from the corresponding sheet when a portion of the face mask is removed from the corresponding sheet.

3. The facial barrier assembly of claim 1, wherein each face mask is a planar face mask.

4. The facial barrier assembly of claim 1, wherein each face mask of the plurality of face masks is water resistant.

5. The facial barrier assembly of claim 1, wherein each face mask of the plurality of face masks is sized and shaped to cover a user's mouth and a portion of the user's nose.

6. The facial barrier assembly of claim 1, wherein each face mask and the corresponding sheet to which the face mask is removably coupled forms a planar unit having a thickness in the range of 5-20 mils.

7. The facial barrier assembly of claim 1, wherein each face mask of the plurality of face masks includes a layer of spunbond polypropylene nonwoven fabric.

8. The facial barrier assembly of claim 1, further comprising:

a carrier coupled to and supporting the roll or the fanfold, the carrier including a shearer configured to contact a first sheet of the plurality of sheets and separate the first sheet of the plurality of sheets from remaining sheets of the plurality of sheets included in the liner.

9. The facial barrier assembly of claim 1, wherein the adhesive material further includes a second linear stripe positioned at the bottom side of each face mask.

10. The facial barrier assembly of claim 9, further comprising a first middle strip and a second middle stripe, and wherein the first middle strips and second middle stripe are aligned with each other, equal to each other in width, and each positioned between the first linear stripe and the second linear stripe on different face masks.

* * * * *